United States Patent [19]

Keller

[11] 4,143,755
[45] Mar. 13, 1979

[54] ROLLER CONVEYOR WITH ALIGNMENT DEVICE

[75] Inventor: Norman L. Keller, Pittsburgh, Pa.

[73] Assignee: Pullman Incorporated, Chicago, Ill.

[21] Appl. No.: 814,522

[22] Filed: Jul. 11, 1977

Related U.S. Application Data

[63] Continuation of Ser. No. 617,901, Sep. 29, 1975.

[51] Int. Cl.² .............................................. B65G 47/24
[52] U.S. Cl. .................................. 198/456; 198/598; 271/250
[58] Field of Search ............... 198/456, 597, 608, 633, 198/636, 783, 786, 722, 598; 271/250, 251

[56] References Cited

U.S. PATENT DOCUMENTS

| | | | |
|---|---|---|---|
| 1,178,286 | 4/1916 | Anderson | 271/250 |
| 1,874,675 | 8/1932 | Werner | 271/251 |
| 1,883,889 | 10/1932 | Farley | 198/416 |
| 2,765,065 | 10/1956 | Liebelt | 198/461 |
| 2,815,111 | 12/1957 | Capps et al. | 198/597 |
| 2,981,399 | 4/1961 | Parker | 198/471 |
| 3,415,389 | 12/1968 | Smith | 198/456 |
| 3,563,721 | 2/1971 | Ritter, Jr. | 198/781 |
| 3,621,973 | 11/1971 | Carlson | 198/456 |
| 3,670,864 | 6/1972 | Grandmontagne | 198/782 |
| 3,842,962 | 10/1974 | Grachev et al. | 198/608 |

Primary Examiner—James B. Marbert
Assistant Examiner—Richard K. Thomson
Attorney, Agent, or Firm—Thomas G. Anderson

[57] ABSTRACT

A conveyor structure of the roller type includes an alignment device for maintaining relatively flat objects in aligned positions with respect to each other. The device includes a plurality of second rollers disposed between the rollers of the conveyor, the second rollers being eccentrically rotatable about axes extending longitudinally or perpendicular to the axis of the first rollers. The second rollers move upwardly between the first rollers to engage the flat underneath surface of articles traveling on the conveyer to lift them up and to move them laterally into engagement with a positive stop position to one side of the conveyer, whereby the objects are then relatively aligned with respect to each other.

8 Claims, 13 Drawing Figures

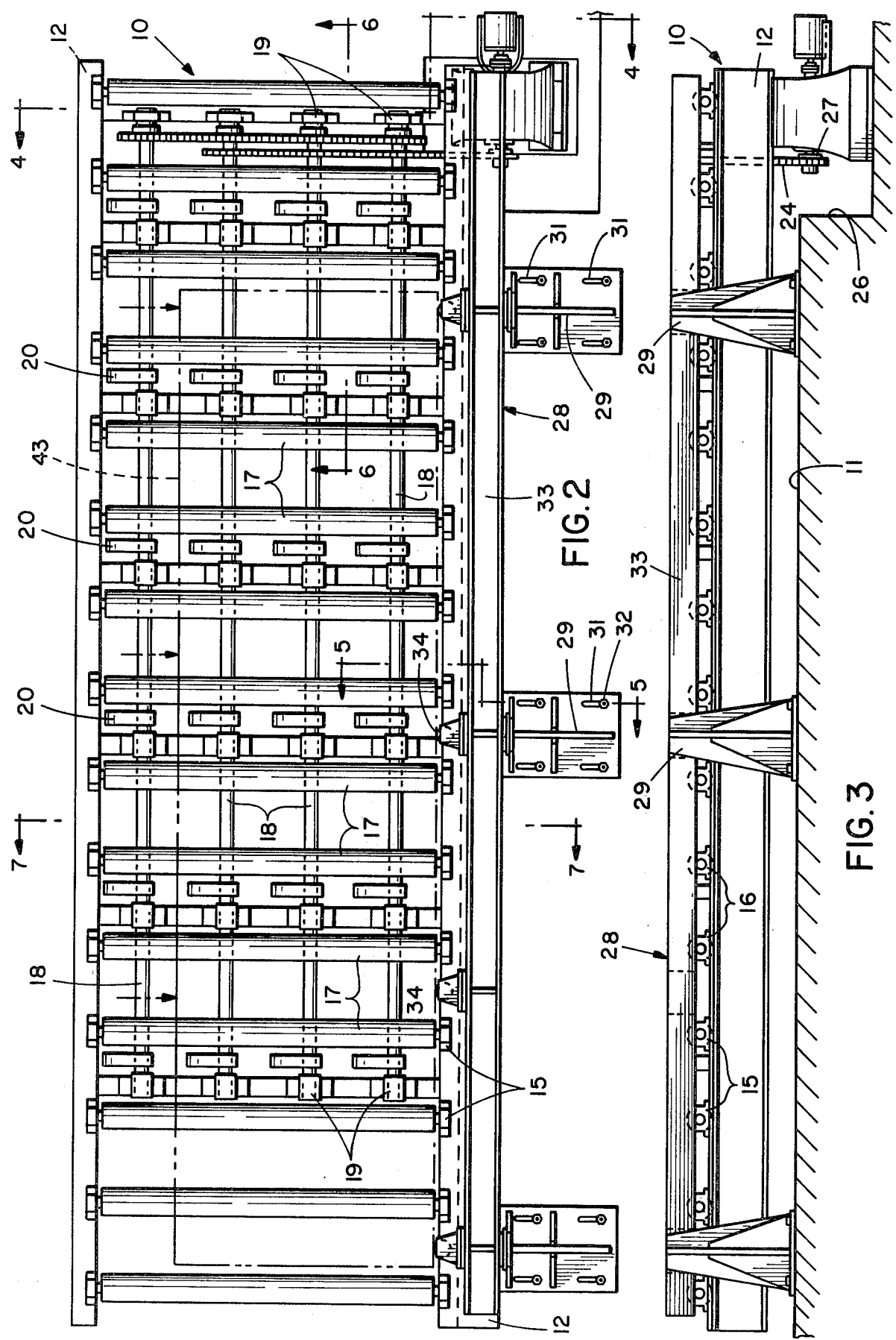

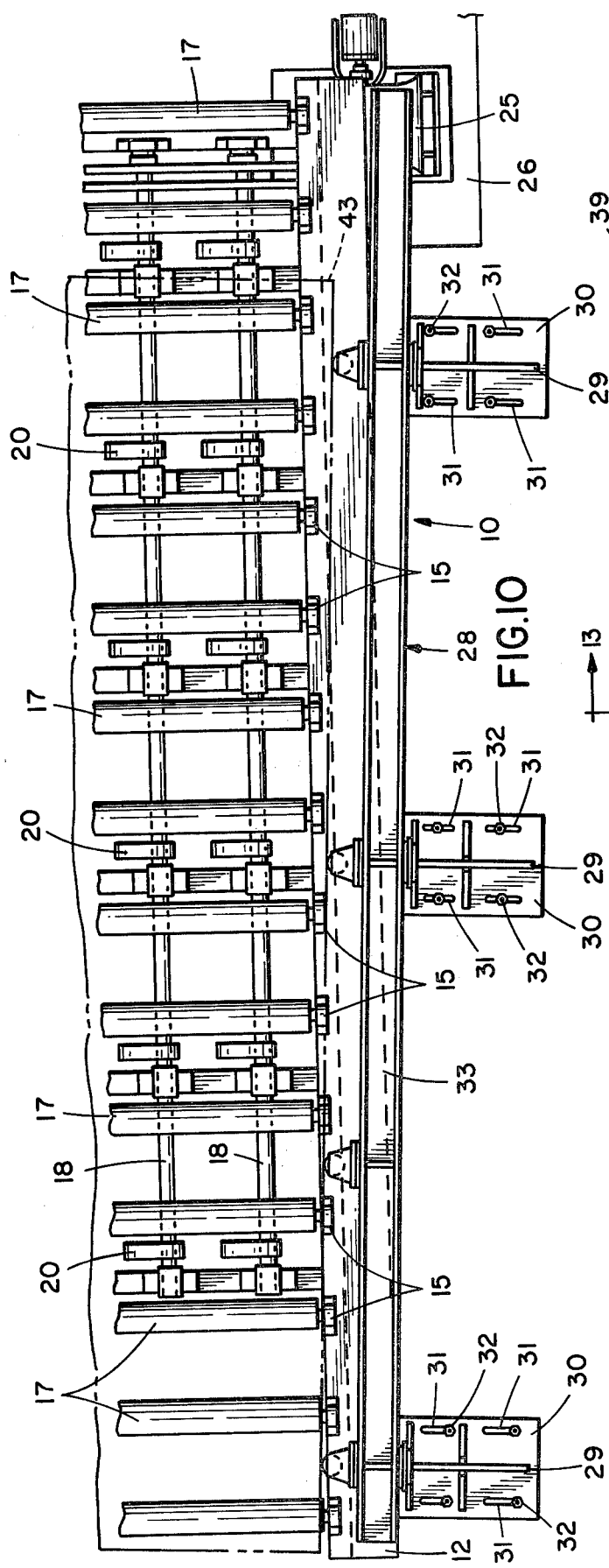
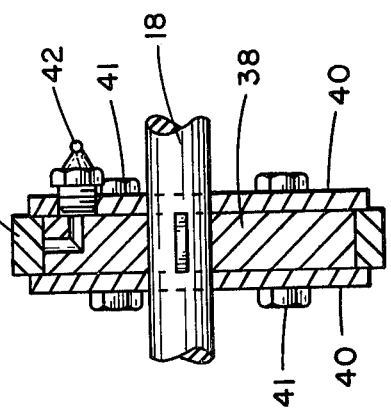
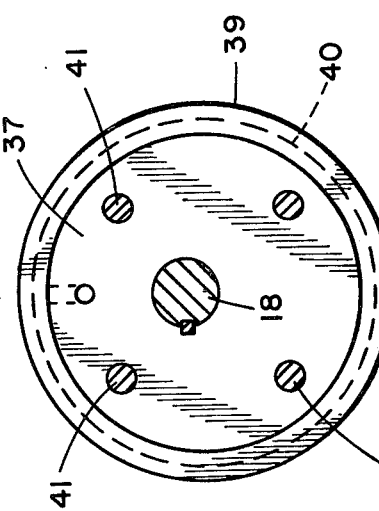
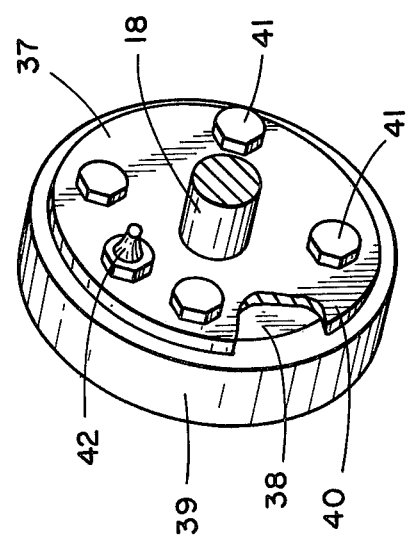

ROLLER CONVEYOR WITH ALIGNMENT DEVICE

This is a continuation of Ser. No. 617,901, filed Sept. 29 1975.

BACKGROUND OF THE INVENTION

1. Field of the Invention

The present invention relates to the conveyer art and particularly to roller type of conveyers for transferring relatively flat objects such as sheet steel, etc.

2. Description of the Prior Art

The prior art is disclosed in such patents as U.S. Pat. Nos. 3,011,665, Dec. 5, 1961 and 3,782,527, Jan. 1, 1974. The present invention is an improvement over the prior art in utilizing a plurality of eccentrically mounted rollers for lifting objects moving on a roller conveyer and moving them laterally against a positive stop to properly align them during their longitudinal movement.

SUMMARY OF THE INVENTION

The primary object of the present invention is to provide an improved roller type of conveyer which includes an alignment mechanism adapted to be actuated for aligning flat objects such as sheet metal as they are traveling on a roller conveyer. The construction comprises a conventional roller type of conveyer which includes in the combination either clipped discs or eccentrically positioned rollers or wheels which are rotatable about axes disposed at right angles with respect to the axis of rotation of the roller conveyers. The discs or wheels are adapted to move into position beneath the plate or object which is carried on the conveyer and thereby raise the same and to move the object in a lateral direction whereupon it engages a stop. The stop is positioned to one side of the conveyer and as the plates are moved against the stop they are automatically aligned relative to each other as they travel on the conveyer. The stop may also be adjusted laterally so as to be offset in the event it is desired to position the objects at an angle as they are moving on the conveyer.

BRIEF DESCRIPTION OF THE DRAWINGS

FIG. 2 is a plan view of the conveyer structure partially disclosed in FIG. 1;

FIG. 3 is a side elevation of the conveyer structure shown in FIG. 2;

FIG. 10 is a partial plan view of a conveyer view similar to FIG. 2, showing a stop structure positioned in offset relation with respect to the conveyer;

FIG. 11 is a perspective view of a modified form of roller structure;

FIG. 12 is a side elevational view of the modified roller structure; and

FIG. 13 is a cross-sectional view taken substantially along line 13—13 of FIG. 12.

DESCRIPTION OF THE PREFERRED EMBODIMENT

Figure 1:
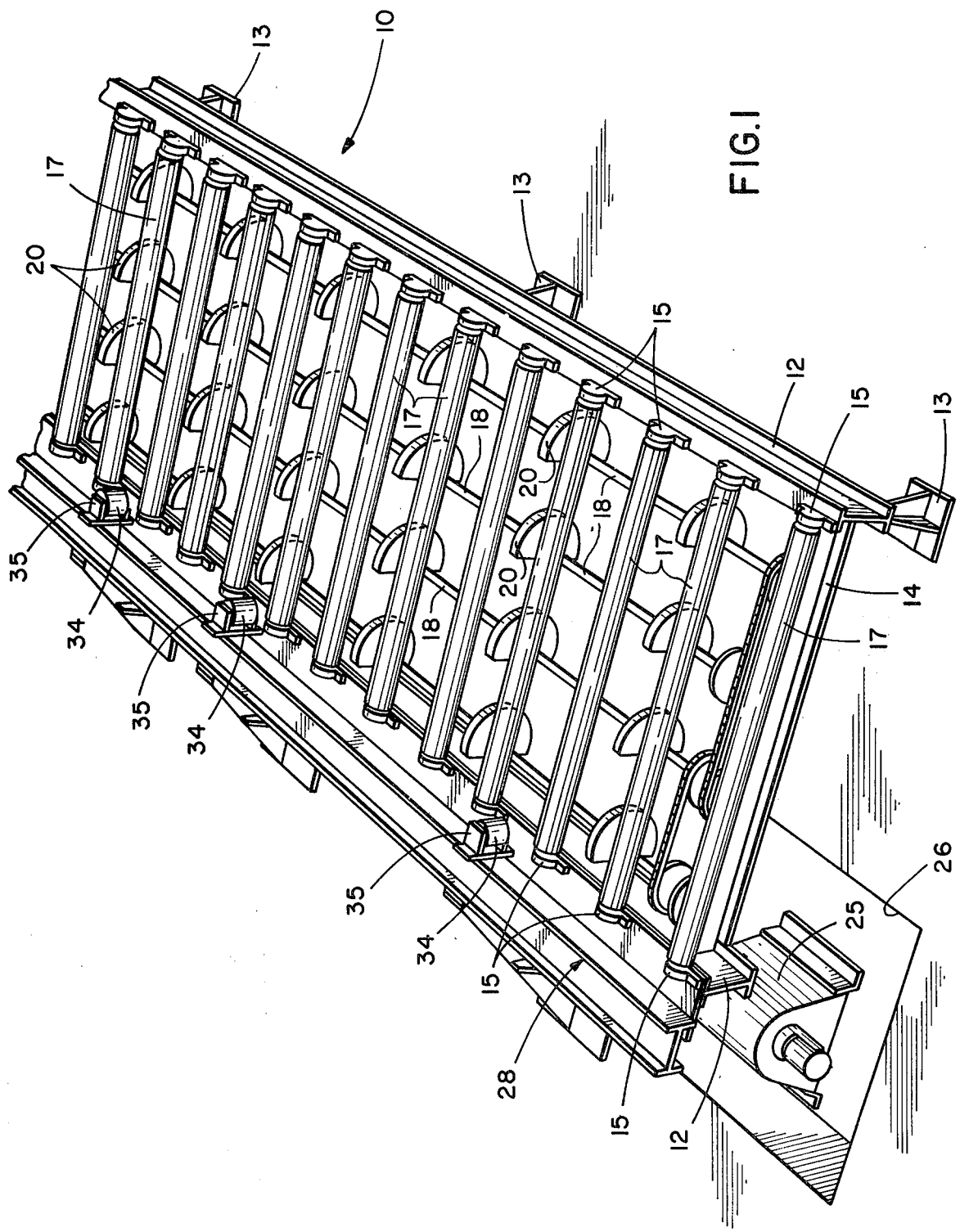
FIG. 1 is a perspective view of a portion of a conveyer showing an improved aligning device.
Figure 6:
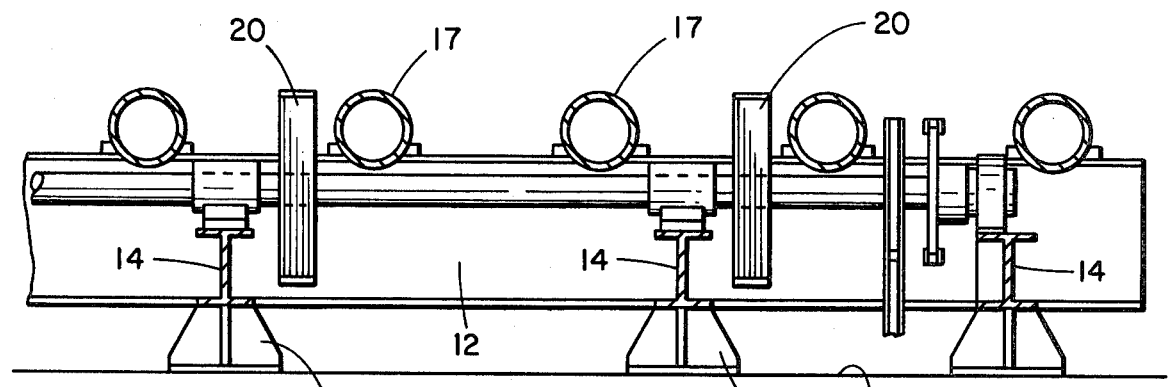
FIG. 6 is a cross-sectional view taken substantially along the line 6—6 of FIG. 2.
Figure 7:
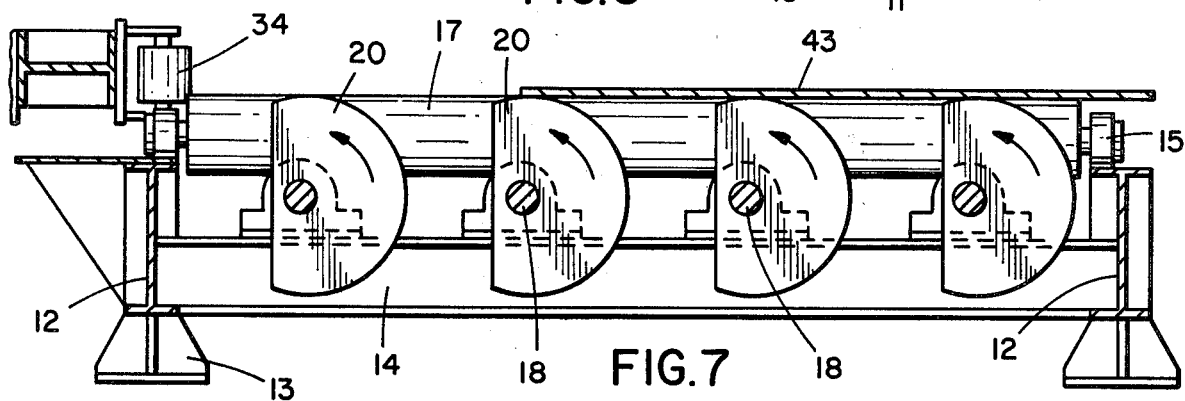
FIG. 7 is a cross-sectional view taken substantially along the line 7—7 of FIG. 2.
Figure 8:
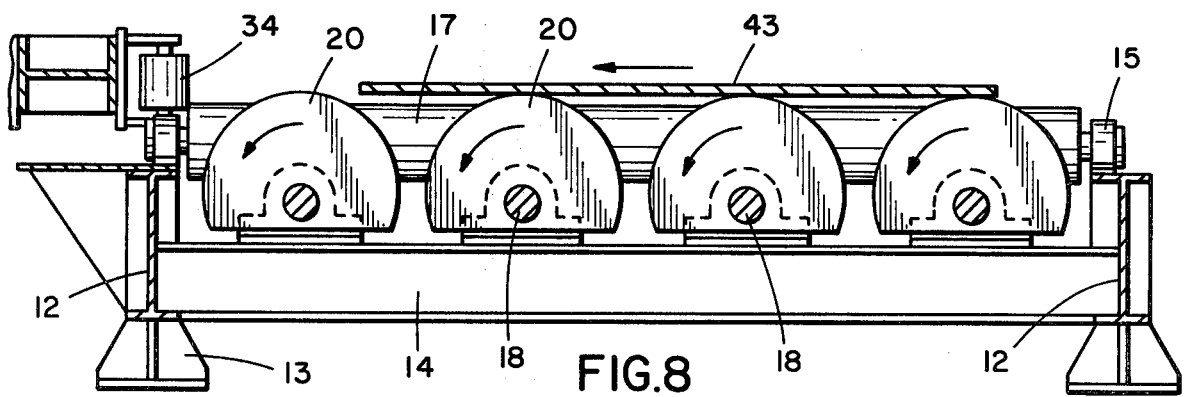
FIGS. 8 and 9 are views similar to FIG. 7 showing the movement of an object on the conveyer as it is being aligned.

Referring now particularly to FIGS. 1, 2 and 3, a conveyer structure 10 is suitably supported on a floor or base 11 and includes longitudinally extending frame members 12 supported on the base 11 by means of feet supports 13. The longitudinally extending frame members 12 are interconnected by transversely extending support beams 14, longitudinally spaced along the conveyer structure. A plurality of journal brackets 15 are longitudinally spaced and supported on the top of the frame members 12 and support shafts 16 on which first roller members 17 are rotatable about transverse axes. A plurality of journal brackets 19 are laterally spaced and supported on the support beams 14 and support a plurality of longitudinal rotatable shafts 18. The shafts 18 therefore are disposed at right angles or perpendicular with respect to the axis of rotation of the shafts 16 of the first roller members 17. The shafts 18 have connected thereto for rotation therewith second alignment rollers 20. The said rollers as best shown in FIGS. 6, 7 and 8 being supported between the first roller members 17. The alignment rollers 20 are of the clipped disc type which includes an arcuate or cylindrical portion 22 and a relatively straight or clipped edge portion 21. Each of the shafts 18 has connected thereto sprockets 23 which are rotated and driven by a suitable chain drive arrangement 24 in turn actuated by a drive motor 25 which is supported in a depressed well 26 in the base 11. A drive sprocket 27 is driven by the drive motor 25 which in turn drives the chain drive arrangement 24 to provide for simultaneous rotation of all of the alignment rollers 20.

Figure 4:
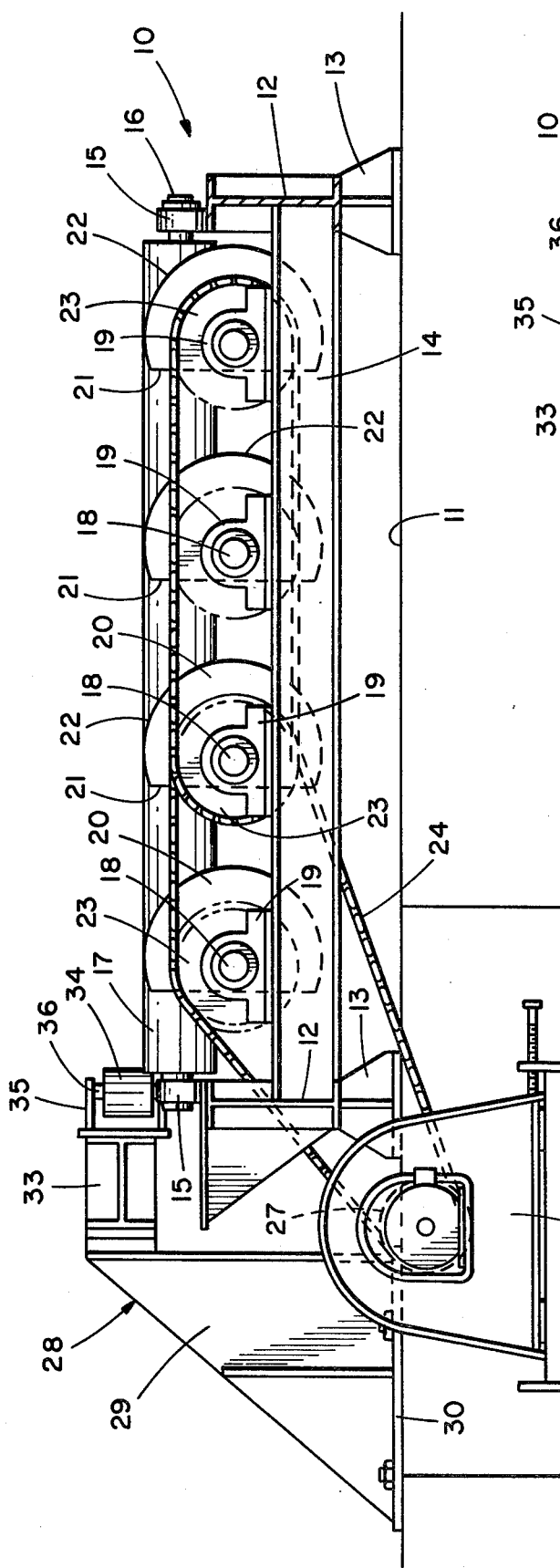
FIG. 4 is a cross-sectional view taken substantially along the line 4—4 of FIG. 2.
Figure 5:
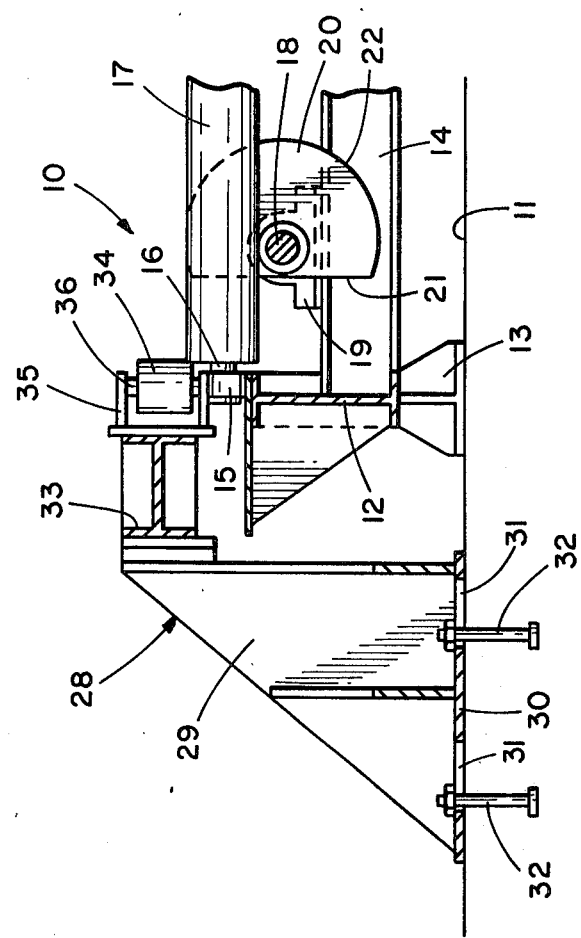
FIG. 5 is a cross-sectional view taken substantially along the line 5—5 of FIG. 2.

A positive stop structure is generally designated at 28 and is positioned along one side of the conveyer structure 10 as shown in FIGS. 1, 2, 3, 4, 5 and 10. The stop structure 28 comprises a plurality of upright brackets 29 having base plates 30 suitably supported on the base 11. Each base plate 30 is provided with a plurality of adjustment slots 31 and the plates are fastened to the base 11 by means of bolt and nut fasteners 32 as best shown in FIG. 5. The upright brackets 29 support a longitudinally extending beam 33 on which a plurality of longitudinally spaced stop rollers 34 are mounted. The stop rollers 34 are supported in brackets 35 and rotate about shafts 36 as best shown in FIGS. 4 and 5. Thus the rollers 34 are rotatable about a vertical axis as compared to the movement of the rollers 17 which are supported about a transverse axis and the alignment rollers 20 which are supported about a longitudinal axis.

A modified type of roller is disclosed in FIGS. 11, 12 and 13 and includes a central hub 38 which is connected to the shaft 18 for rotation therewith. A tire 39 of a softer material than steel, such as brass, etc., is supported on the hub 38 to rotatably slide relative thereto. Retainer plates 40 suitably retain the brass tire 39 on the hub structure 38. The plates 40 are connected to the hub 38 by means of bolt and nut connections 41 and a suitable lubricating fitting 42 is provided to lubricate the roller and thereby provide for free rotation of the tire 39 relative to the hub 38.

Operation

Figure 9:
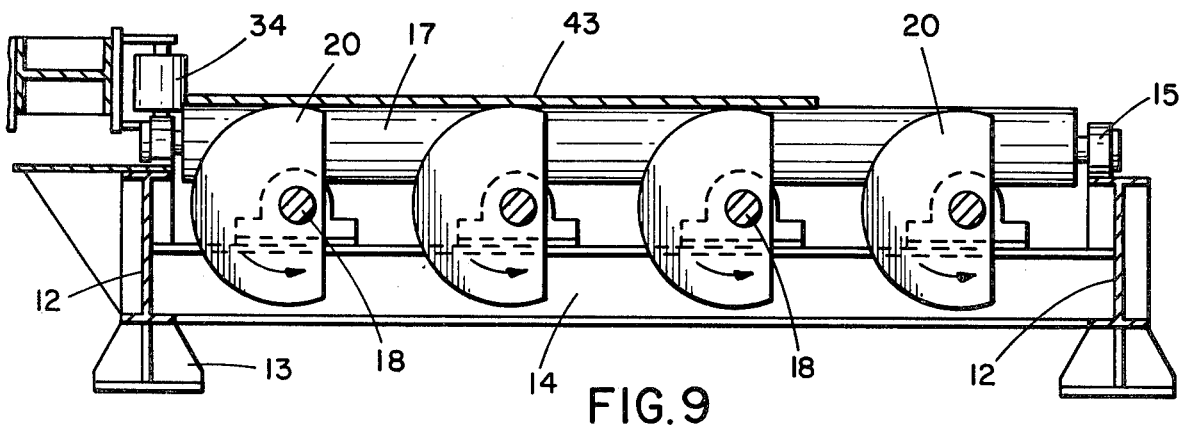

The objects being conveyed on the conveyer structure 10, as best shown in FIGS. 2, 6, 7, 8 and 10, are flat sheets 43 which may be steel or any other material which is desired to be conveyed. The type of objects 43 having a flat underneath surface are easily movable along the conveyer as they are directed by suitable conventional feeding devices emanating from an operating machine which has processed the metal plates or sheet. The alignment device disclosed is for the sole purpose of keeping the sheets in relative alignment so that they are properly maintained in their longitudinal course on the conveyer structure. As the sheets are moving along the conveyer in a longitudinal direction as best shown in FIGS. 6, 7 and 8, the clipped discs 20 or rollers are rotatable in a counter clockwise direction whereupon the sheet 43 is moved to the left from the position shown in FIG. 7, to the position shown in FIG. 8. As shown in FIG. 9, the sheet is moved laterally into engagement with the roller 34, whereupon the discs 20 lower the sheet 43 again onto the conveyer rollers 17. The sheets 43 then continue their movement in a straight direction properly aligned on the conveyer. The alignment rollers, of course, are functional when the arcuate portions of the rollers project upwardly above the conveyer rollers 17 as shown in FIG. 8. The clipped or flat surface 22 being disposed at all times below the top surface of the conveyer rollers 17. As shown in FIG. 7 the clipped discs or alignment rollers 20 initially engage the flat plate 43 and moves the same vertically upwardly and the sideways to the left as shown in FIG. 8 and as the alignment rollers turn further they begin to drop the plate 43 as shown in FIG. 9 onto the rollers 17 whereupon they continue their conveying movement in the direction desired. All of the alignment rollers move in unison at intervals so as to provide continuing alignment of the sheet as it is traveling along the conveyer. As best shown in FIG. 10, it may be desirable for the objects to be moved at an acute angle and it is a simple matter thereupon to change the positive stop 28 to accommodate this desired change in position. The brackets 29 are adjustable by virtue of slots 31 provided in the base plates 30 so that by simply loosening the bolt arrangement 32 and retightening them, the offset relation of the stop 28 can be achieved.

In the modified form of the alignment rollers shown in FIGS. 11, 12 and 13 the hub 38 is eccentrically positioned relative to the shaft 18 and this arrangement, of course, permits the rollers to be rotated upwardly into engagement with the plates or sheets 43 for raising them. The eccentric rollers lift the plate and roll it at right angles to the rollers of the conveyer. When the plate hits the positive stop the eccentric rollers or the clipped type rollers start to slide in reference to the plate. In the modified version, the tire 39 engages the underneath surface of the plate and the hub 38 may pivot relative to the tire 39. The eccentric action being such that the plate is also moved toward the positive stop structure. In the modified form of roller, the tire which may be of brass or similar softer material, prevents possible scratches to the material to be conveyed.

By the arrangement shown, the differential sliding of the eccentric rollers causes the plate to line up with the positive stop which is provided. By merely hitting the stop, the plate or sheet members are properly aligned relative to the conveyer and to each other. The advantages of the mechanism are that the device requires only rotation of components to produce a linear translation of a plate. The device also can transfer a plate in either direction by reversing the direction of rotation. Sliding of the plate only occurs when the positive stop is hit by the plate. The prior art also has included pusher type alignment devices which are frequently jammed and thus malfunction. During normal operation the present alignment device eliminates the pusher type structures and provides for positive alignment with the elimination of malfunction which occurs in structures of the prior art.

The foregoing description and drawings merely explain and illustrate the invention, and the invention is not limited thereto, except insofar as the intended claims are so limited, as those skilled in the art have the disclosure before them will be able to make modifications and variations therein without departing from the scope of the invention.

What is claimed is:

1. A conveyor including a frame having horizontally spaced longitudinally extending frame members,
   a plurality of longitudinally spaced conveying roller members journalled on said frame members about generally horizontal and transversely extending axes and defining a conveying surface adapted to support the lower sides of objects carried thereupon,
   means for maintaining said objects in alignment on said conveyor comprising
   shifting means being extendable above said conveying surface for shifting the objects axially of said rollers above said conveying surface, and
   aligning means comprising a support along one side of said frame and a plurality of guide rollers rotatably mounted on the support on substantially vertical axes, said plurality of rollers projecting below the plane of said conveying surface to define a generally vertical aligning surface positionable to substantially intersect said conveying surface along the path of movement of said objects for supported sequential aligning engagement of each of the objects, thereby essentially obviating obstructive jamming of the objects by said aligning means as the objects move along the conveying surface.

2. The invention according to claim 1, and
   means mounting said aligning means and positioning said aligning means translationally axially of said conveying rollers.

3. The invention according to claim 2, and
   said mounting means comprising means for angularly positioning said aligning means about one of a plurality of spaced vertical axes.

4. The invention according to claim 3, and
   said vertical axes being spaced longitudinally along said conveyor.

5. The invention according to claim 3, and
   said vertical axes being spaced laterally of said conveyor.

6. The invention according to claim 2, and
   said mounting means including slotted fastener means releasably securing said alignment means in its respective positions for angulating and translating said alignment means.

7. A conveyor including a frame having horizontally spaced longitudinally extending frame members,
   a plurality of longitudinally spaced conveying roller members journalled on said frame members about generally horizontal and transversely extending axes and defining a conveying surface adapted to support the lower sides of objects carried thereupon, means for maintaining said objects in alignment on said conveyor comprising, means for shifting the objects axially of said rollers above said conveying surface, aligning means comprising a support along one side of said frame and a plurality of guide rollers rotatably mounted on the support on substantially vertical axes and projecting below the plane of said conveying surface along the path of movement of said objects for sequential engagement by each of the objects, and said shifting means comprising a cylindrical hub and a tire formed of a material of softer quality that will reduce wear on the objects to be conveyed.

8. The invention according to claim 7, and
said material being brass.

* * * * *